US006333906B1

(12) United States Patent
Yanagisawa et al.

(10) Patent No.: US 6,333,906 B1
(45) Date of Patent: Dec. 25, 2001

(54) OPTICAL PICKUP AND INFORMATION REPRODUCING APPARATUS (75) Inventors: Takuma Yanagisawa; Shogo Miyanabe; Hiroki Kuribayashi, all of Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/388,608

(22) Filed: Sep. 2, 1999

(30) Foreign Application Priority Data

Sep. 7, 1998 (JP) .................................................. 10-252196

(51) Int. Cl.$^7$ ...................................................... G11B 7/00
(52) U.S. Cl. ........................................ 369/103; 369/112.01
(58) Field of Search ............................... 369/103, 112.01, 369/112.03, 112.1, 112.15

(56) References Cited

U.S. PATENT DOCUMENTS 6,280,884 * 8/2001 Bjorklund et al. ...................... 359/3

FOREIGN PATENT DOCUMENTS 8-184707 * 7/1996 (JP) ........................................... 359/3

* cited by examiner

Primary Examiner—Nabil Hindi
(74) Attorney, Agent, or Firm—Nixon & Vanderhye (57) ABSTRACT An optical pickup for reading information recorded on information tracks of a recording medium by using a main light beam and a subsidiary light beam includes a diffraction device for diffracting an original light beam to generate the main light beam and the subsidiary light beam. The main light beam is applied to a reading track which is one of the information tracks on which the information to be read is recorded. The subsidiary light beam is applied to the information track adjacent to the reading track. The diffracting device is made of an optical material having coefficient of linear expansion $\beta$, which is determined as follows:

$$\alpha - \Delta\alpha_1 \leq \beta \leq \alpha + \Delta\alpha_2, \quad \alpha = \Delta\lambda/\lambda_0,$$

$$\Delta\alpha_1 = \{(1+\alpha \times \Delta t_{max}) \times \Delta L_{max}\}/\{(L_0 + \Delta L_{max}) \times \Delta t_{max}\},$$

$$\Delta\alpha_2 = \{(1+\alpha \times \Delta t_{max}) \times \Delta L_{max}\}/\{(L_0 - \Delta L_{max}) \times \Delta t_{max}\},$$

where $\lambda_0$ is a wavelength of the original light beam at a design temperature, $\Delta\lambda$ is an amount of a change of the wavelength of the original light beam per unit temperature, $\Delta t_{max}$ is a predetermined permissible amount of a change of an ambient temperature, $L_0$ is a spacing between an irradiation position of the subsidiary light beam and an irradiation position of the main light beam at the design temperature, and $\Delta L_{max}$ is a predetermined permissible amount of a change of the spacing.

20 Claims, 3 Drawing Sheets

OPTICAL PICKUP AND INFORMATION REPRODUCING APPARATUS

BACKGROUND OF THE INVENTION

1. Field of the Invention

The present invention relates to an optical pickup for reproducing information recorded on a recording medium such as an optical disk, and in particular, to an optical pickup for reproducing information while removing crosstalk caused by adjacent information tracks, and an information reproducing apparatus having such an optical pickup.

2. Description of the Related Art

An optical disk has information tracks formed on its surface. Information is recorded on the information tracks. When reproducing information recorded on an information track, a light beam is applied to an information track, reflected light of the light beam is received, and information is extracted from the reflected light thus received. When a light beam is applied to an information track on which information to be reproduced has been recorded, the irradiation range of the light beam extends over not only the information track to which the light beam should be applied but also other information tracks adjacent to the information track to which the light beam should be applied. Because of demand of higher density of recorded information, this phenomenon is more remarkable in a recording medium having a small interval between information tracks. If the irradiation range of the light beam extends over other information tracks, crosstalk is caused thereby. The term "crosstalk" means that information on adjacent tracks gets mixed in information on the information track to be originally reproduced. If crosstalk occurs, it becomes difficult to accurately reproduce information to be reproduced.

As a method for removing crosstalk, the three beam method is known. In the three beam method, a light beam is applied to an information track from which information should be originally reproduced. In addition, a light beam is also applied to each of tracks adjacent to the information track from which information should be originally reproduced. In other words, a total of three light beams are applied toward an optical disk. From a light receiving signal based upon reflected light from an information track to be reproduced, light receiving signals based upon reflected light from two adjacent information tracks are subtracted to remove the crosstalk.

In a typical reproducing apparatus employing the three beam method, one light beam is divided into three light beams by using a diffraction grating. Among three beams resulting from the division, one is used as a main light beam whereas two remaining beams are used as subsidiary light beams for removing the crosstalk. The main light beam is applied to the information track having information to be reproduced, whereas the subsidiary light beams are applied to the adjacent tracks.

The subsidiary light beams are respectively applied to information tracks located on either side of the information track having information to be reproduced so as to be adjacent thereto. This means that irradiation positions of the two subsidiary light beams are disposed so as to be displaced respectively leftward and rightward from the irradiation position of the main light beam, assuming the extension direction of information tracks on which the irradiation position of the main light beam is located to be a center line. In other words, the subsidiary light beams are disposed so as to be displaced in the radial direction of the optical disk.

In addition, irradiation positions of the two subsidiary light beams are disposed so as to be equally displaced before and behind the irradiation position of the main light beam in the extension direction of information tracks. In other words, the irradiation positions of the subsidiary light beams are disposed so as to be displaced not only in the radial direction of the optical disk but also in the circumferential direction of the optical disk. If the three light beams are disposed so as to line up in a single file in the radial direction of the optical disk, then irradiation ranges of the light beams interfere with each other, and information on each information track cannot be detected accurately. In order to prevent this, the irradiation positions of the subsidiary light beams are disposed so as to displaced in the circumferential direction of the optical disk.

If the irradiation positions of the three light beams are disposed so as to be displaced in the circumferential direction of the optical disk, then light receiving signals obtained from respective light beams diverges in time. The temporal divergence of the light receiving signals can be removed by electrically delaying the light receiving signals.

It is now assumed that the spacing between the irradiation position of the main light beam and the irradiation position of each of the subsidiary light beams in the circumferential direction of the optical disk is L. The distance L can be represented as $$L = F \times (\lambda/D) \tag{1}$$

where $\lambda$ is the oscillation wavelength of the light source, D is the pitch of the diffraction grating, and F is the focal length of an objective lens for focusing each light beam onto an information track corresponding thereto.

As for an optical material used for the diffraction grating, an optical material having the least possible coefficient of linear expansion $\beta$ is used from the viewpoint of stability against a change of the ambient temperature.

On the other hand, as the light source for emitting a light beam, a laser diode is used in many cases. The laser diode typically has poor temperature characteristics. As the ambient temperature changes, the oscillation length $\lambda$ of the laser diode changes. By the way, since an optical material having the least possible coefficient of linear expansion $\beta$ is used for the diffraction grating, a change of the pitch D of the diffraction grating caused by a change of the ambient temperature is small. As a result, a change of the oscillation frequency $\lambda$ of the laser diode caused by a change of the ambient temperature changes the spacing L (see the equation (1)). If the spacing L changes, time spacing between light receiving signals actually obtained from the reflected light of a light beam becomes different from time spacing preset in a removing circuit in order to electrically remove a time difference of an obtained light receiving signal. This results in a problem that the crosstalk cannot be removed accurately and the stability is poor provided that the ambient temperature changes.

SUMMARY OF THE INVENTION

An object of the present invention is to provide an optical pickup for removing crosstalk by using a plurality of light beams, capable of removing crosstalk accurately and stably even if the oscillation wavelength of a light source is changed by a change of the ambient temperature and capable of reproducing information accurately and stably, and provide an information reproducing apparatus having such an optical pickup.

An optical pickup in accordance with the present invention is a device for reading information recorded on a plurality of information tracks of a recording medium by using at least a main light beam and a subsidiary light beam. The main light beam is applied to a reading track which is one of the plurality of information tracks on which the information to be read is recorded. The subsidiary light beam is applied to an adjacent track which is different one of the plurality of information tracks adjacent to the reading track. The optical pickup includes: a light source for emitting an original light beam; a diffraction device for diffracting the original light beam to divide the original light beam into the main light beam and the subsidiary light beam, so that the main light beam and the subsidiary light beam are applied to the reading track and the adjacent track, respectively; and a receiving device for receiving the main light beam and the subsidiary light beam reflected by the recording medium and generating a main signal corresponding to the received main light beam and a subsidiary signal corresponding to the received subsidiary light beam. The diffracting device is made of an optical material having coefficient of linear expansion $\beta$, which is determined as follows:

$$\alpha - \Delta\alpha_1 \leq \beta \leq \alpha + \Delta\alpha_2,$$

$$\alpha = \Delta\lambda/\lambda_0,$$

$$\Delta\alpha_1 = \{(1+\alpha\times\Delta t_{max})\times\Delta L_{max}\}/\{(L_0+\Delta L_{max})\times\Delta t_{max}\},$$

$$\Delta\alpha_2 = \{(1+\alpha\times\Delta t_{max})\times\Delta L_{max}\}/\{(L_0-\Delta L_{max})\times\Delta t_{max}\}, \quad (2)$$

where $\lambda_0$ is a wavelength of the original light beam at a design temperature of the optical pickup, $\Delta\lambda$ is an amount of a change of the wavelength of the original light beam per unit temperature, $\Delta t_{max}$ is a predetermined permissible amount of a change of an ambient temperature at which the optical pickup is used, $L_0$ is a spacing between an irradiation position of the subsidiary light beam and an irradiation position of the main light beam at the design temperature, and $\Delta L_{max}$ is a predetermined permissible amount of a change of the spacing between the irradiation position of the subsidiary light beam and the irradiation position of the main light beam.

Since the coefficient of linear expansion $\beta$ of the optical material of the diffracting device is determined according to the aforementioned equations (2), a change of the spacing between the irradiation position of the main light beam and the irradiation position of the subsidiary light beam can be restricted within a permissible range, even if a change of the wavelength of the original light beam is caused by a change of the ambient temperature. Therefore, the crosstalk can be removed accurately and stably. Accordingly, the information recorded on the recording medium can be read accurately and stably.

In the aforementioned optical pickup, it is preferable that the coefficient of linear expansion $\beta$ is equal to the value $\alpha$. That is to say, it is preferable that the coefficient of linear expansion $\beta$ satisfies the equation:

$$\beta = \alpha. \quad (3)$$

If the coefficient of linear expansion $\beta$ is equal to the value $\alpha$, the spacing between the irradiation position of the main light beam and the irradiation position of the subsidiary light beam can be held constant, even if a change of the wavelength of the original light beam is caused by a change of the ambient temperature. Accordingly, the crosstalk can be removed accurately and stably.

As an optical material of the diffracting device, diethylene glycol bisallyl carbonate, poly-4-methyl pentene-1, poly methyl methacrylate or poly carbonate may be used, because each material satisfies at least the aforementioned equations (2).

The aforementioned optical pickup in accordance with present invention reads the information recorded on the recording medium using at least two light beams. Another type of the optical pickup in accordance with the present invention uses three light beams. Hereinafter, this type of the optical pickup will be described.

The optical pickup reads information recorded on a plurality of information tracks of a recording medium by using a main light beam, a first subsidiary light beam and a second subsidiary light beam. The main light beam is applied to a reading track which is one of the plurality of information tracks on which the information to be read is recorded. The first subsidiary light beam is applied to a first adjacent track which is different one of the plurality of information tracks adjacent to one side of the reading track. The second subsidiary light beam is applied to a second adjacent track which is further different one of the plurality of information tracks adjacent to another side of the reading track. A spacing between an irradiation position of the main light beam and an irradiation position of the first subsidiary light beam is equal to a spacing between an irradiation position of the main light beam and an irradiation position of the second subsidiary light beam. The optical pickup includes: a light source for emitting an original light beam; a diffraction device for diffracting the original light beam to divide the original light beam into the main light beam, the first subsidiary light beam and the second subsidiary light beam, so that the main light beam, the first subsidiary light beam and the second subsidiary light beam are applied to the reading track, the first adjacent track and the second adjacent track, respectively; and a receiving device for receiving the main light beam, the first subsidiary light beam and the second subsidiary light beam reflected by the recording medium and generating a main signal corresponding to the received main light beam, a first subsidiary signal corresponding to the received first subsidiary light beam and a second subsidiary signal corresponding to the received second subsidiary light beam. The diffracting device is made of an optical material having coefficient of linear expansion $\beta$, which is determined by the aforementioned equations (2). In addition, the spacing between the irradiation position of the first subsidiary light beam and the irradiation position of the main light beam at the design temperature ($L_0$) is equal to the spacing between the irradiation position of the second subsidiary light beam and the irradiation position of the main light beam at the design temperature.

According to this type of optical pickup, each of a change of the spacing between the irradiation position of the main light beam and the irradiation position of the first subsidiary light beam and a change of the spacing between the irradiation position of the main light beam and the irradiation position of the second subsidiary light beam can be restricted within a permissible range, even if a change of the wavelength of the original light beam is caused by a change of the ambient temperature. Therefore, the crosstalk caused by both the first adjacent track and the second adjacent track can be removed accurately and stably. Accordingly, the information recorded on the recording medium can be read accurately and stably.

As the optical pickup uses three light beams, it can be used as an optical pickup using the three-beam method. In this case, the main light beam, the first subsidiary light beam and the second subsidiary light beam are moved along the respective information tracks in a predetermined direction, the irradiation position of the first subsidiary light beam is located ahead of the irradiation position of the main light beam in the predetermined direction, and the irradiation position of the main light beam is located ahead of the irradiation position of the second subsidiary light beam in the predetermined direction. Since both a change of the spacing between the irradiation position of the main light beam and the irradiation position of the first subsidiary light beam and a change of the spacing between the irradiation position of the main light beam and the irradiation position of the second subsidiary light beam can be restricted within the permissible range, the accuracy of reproduction of the information recorded on the recording medium using the three beam method can be improved.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Embodiments of the present invention will now be described by referring to the drawing.

The spacing L between the main light beam for reproducing information and the subsidiary light beams for detecting crosstalk is represented as $$L = F \times (\lambda/D) \quad (4)$$

where D is the pitch of the diffraction grating, F is the focal length of an objective lens, and $\lambda$ is the wavelength of the light beams emitted from the light source. Even if the oscillation length $\lambda$ of the light beams is changed by a change of the ambient temperature, the spacing L can be kept constant provided that the term ($\lambda/D$) of the equation (4) can be kept constant.

Letting the oscillation wavelength at a design temperature of the optical pickup be $\lambda_0$ and the pitch of the diffraction grating at the design temperature be $D_0$, the spacing $L_0$ between the irradiation position of the main light beam and each of the irradiation positions of the subsidiary light beams at this time becomes as represented by the following equation.

$$L_0 = F \times (\lambda_0/D_0) \quad (5)$$

It is now assumed that the oscillation wavelength increases (decreases) by $\Delta\lambda$ when the ambient temperature has risen (fallen) by 1° C. It is also assumed that when the ambient temperature rise (fall) of 1° C. causes expansion or contraction of the diffraction grating and thereby increases (decreases) the pitch by $\Delta D$. When the ambient temperature has changed by t°C., the spacing L(t) between the irradiation position of the main light beam and each of the irradiation positions of the subsidiary light beams becomes as represented by the following equation.

$$L(t)$$
$$= F \times \{(\lambda_0 + \Delta\lambda \times t)/(D_0 + \Delta D \times t)\}$$
$$= F \times [[\lambda_0 \times \{1 + (\Delta\lambda/\lambda_0) \times t\}]/[D_0 \times \{1 + (\Delta D/D_0) \times t\}]] \quad (6)$$

Therefore, the spacing between the irradiation position of the main light beam and each of the irradiation positions of the subsidiary light beams can be kept constant irrespective of the change of the ambient temperature, provided that $$\Delta D/D_0 = \Delta\lambda/\lambda_0. \quad (7)$$

Typically, a change factor of the pitch ($\Delta D/D_0$) is represented by the coefficient of linear expansion $\beta$ of the diffraction grating. If the change factor of the oscillation wavelength ($\Delta\lambda/\lambda_0$) of the light source caused by a change of the ambient temperature is equal to the coefficient of linear expansion $\beta$ of the diffraction grating, therefore, the spacing between the irradiation position of the main light beam and each of the irradiation positions of the subsidiary light beams can always be kept constant.

In the present invention, the spacing between the irradiation position of the main light beam and each of the irradiation positions of the subsidiary light beams is kept constant by setting the coefficient of linear expansion $\beta$ of the diffraction grating for generating the main light beam and the subsidiary light beams equal to a change value of the oscillation length of the light source caused by the temperature.

Figure 1:
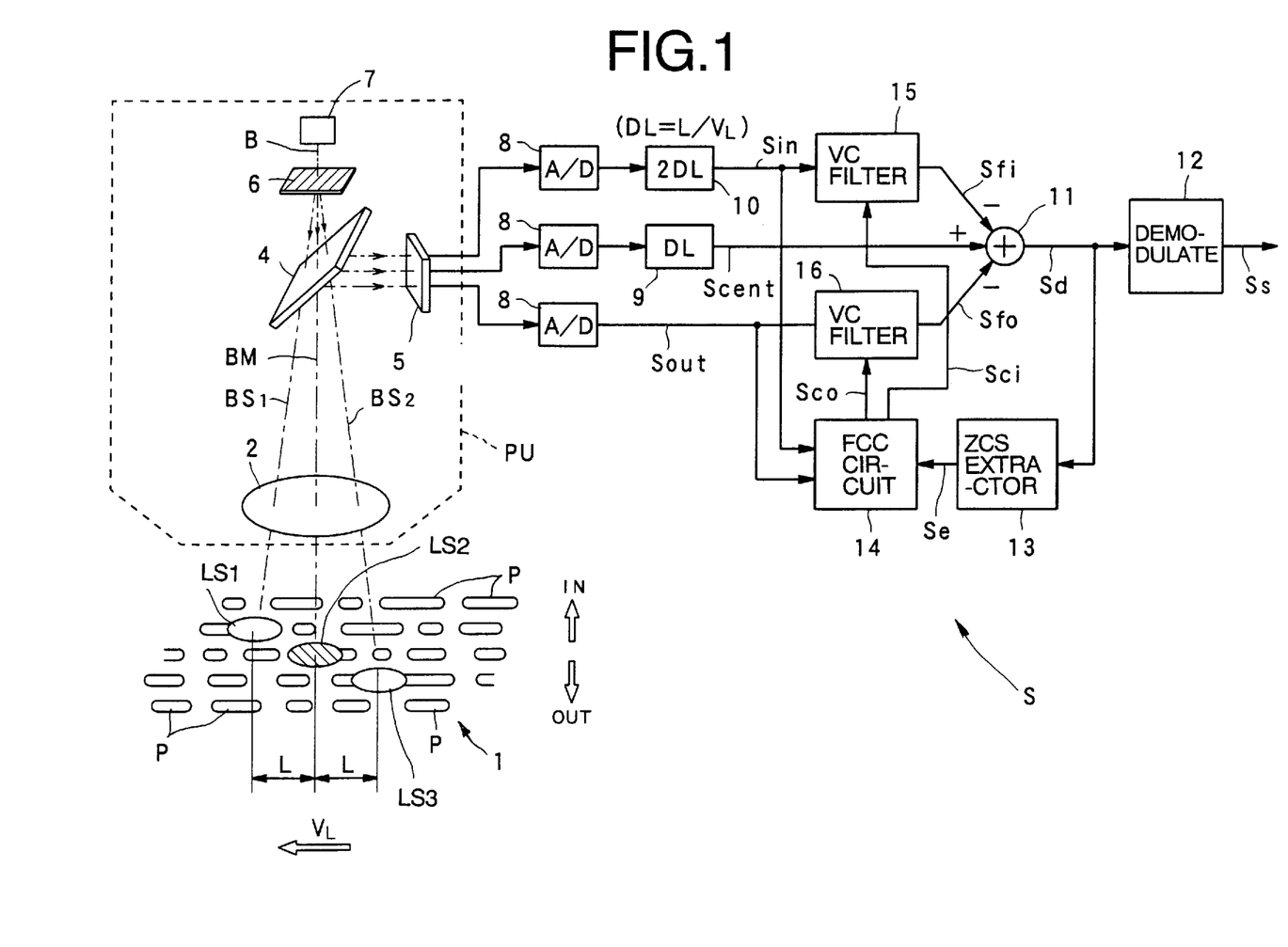
FIG. 1 is a block diagram showing a schematic configuration of an information reproducing apparatus of an embodiment.

FIG. 1 shows an information reproducing apparatus S according to an embodiment of the present invention. The information reproducing apparatus S is an apparatus for reproducing information recorded on an optical disk 1 which is a disklike recording medium having information tracks taking the shape of concentric circles or a spiral. On the optical disk 1, information is formed on the information tracks as a sequence of pits.

As shown in FIG. 1, the information reproducing apparatus S includes a laser diode 7 serving as a light source, a diffraction grating 6 serving as a diffraction means, a beam splitter 4, an objective lens 2, a detector 5 serving as a light receiving means, three A/D converters 8, delay circuits 9 and 10, a subtracter 11 serving as a removing means, a demodulator 12 serving as a reproducing means, a zero cross sample extractor (ZCS extractor) 13, a filter coefficient computation circuit (FCC circuit) 14, and variable coefficient filters (VC filter) 15 and 16 formed of transversal filters.

In this configuration, an optical pickup PU of an embodiment includes the laser diode 7, the diffraction grating 6, the beam splitter 4, the objective lens 2, and the detector 5.

Recorded information on the optical disk 1 has been recorded by using pits P having a plurality of kinds of lengths corresponding to recorded information and lining up in a single file in their longitudinal direction to form an information track as shown in FIG. 1. Furthermore, the rotation speed of the optical disk 1 in the tangential direction is $V_L$.

When reproducing information recorded on the optical disk 1, the laser diode 7 first emits a light beam B which is laser light serving as an original light beam. The diffraction grating 6 divides the light beam B into a main light beam BM, a first subsidiary light beam $BS_1$, and a second subsidiary light beam $BS_2$. Subsequently, the beam splitter 4 transmits a part of each of the main light beam BM, the first subsidiary light beam $BS_1$, and the second subsidiary light beam $BS_2$ to make it arrive at the objective lens 2. The objective lens 2 applies the main light beam BM, the first subsidiary light beam $BS_1$, and the second subsidiary light beam $BS_2$ which have been transmitted through the beam splitter 4 to the optical disk 1.

At this time, the main light beam BM is applied to an information track on which information to be reproduced has been recorded (hereafter referred to as reproduction track). As a result, a central light spot LS2 is formed on the reproduction track. Furthermore, the first subsidiary light beam $BS_1$ is applied to an information track located immediately inside the reproduction track (hereafter referred to as inner track). As a result, an inner light spot LS1 is formed on the inner track. Furthermore, the second subsidiary light beam $BS_2$ is applied to an information track located immediately outside the reproduction track (hereafter referred to as outer track). As a result, an outer light spot LS3 is formed on the outer track.

Thereafter, the main light beam BM, the first subsidiary light beam $BS_1$, and the second subsidiary light beam $BS_2$ applied to respective information tracks are modulated in intensity by pits P formed on respective information tracks. Furthermore, the plane of polarization of each of the beams BM, $BS_1$ and $BS_2$ is rotated, when it is reflected by the optical disk 1. And the beams BM, $BS_1$ and $BS_2$ arrive at the beam splitter 4 again via the objective lens 2. Furthermore, the beams BM, $BS_1$ and $BS_2$ are reflected by the beam splitter 4 so as to proceed to a light receiving face of the detector 5.

The detector 5 receives separately and independently the main light beam BM, the first subsidiary light beam $BS_1$, and the second subsidiary light beam $BS_2$ inputted thereto, and converts the beams BM, $BS_1$ and $BS_2$ respectively to electric signals. In other words, the main light beam BM, the first subsidiary light beam $BS_1$, and the second subsidiary light beam $BS_2$ are converted respectively to a central detected signal Scent, an inner detected signal Sin, and an outer detected signal Sout by the detector 5. These three signals are inputted to the three A/D converters 8, and converted to digital signals.

The digitized outer detected signal Sout is inputted to the variable coefficient filter 16 as it is. On the other hand, the digitized central detected signal Scent is delayed in the delay circuit 9 by a delay value DL, and then inputted to the subtracter 11. Furthermore, the digitized inner detected signal Sin is delayed in the delay circuit 10 by a delay value (DL×2), and then inputted to the variable coefficient filter 15.

The delay value DL is derived by $$DL=L/V_L \quad (8)$$

where L is the distance in a direction along the information tracks of the optical disk 1 between the inner light spot LS1 and the central light spot LS2, and between the central light spot LS2 and the outer light spot LS3 (see FIG. 1). In the case where the optical disk 1 is a DVD, L is in the range of approximately 10 to 20 $\mu$m. $V_L$ is the rotation velocity of the optical disk 1 in the tangential direction.

Delay value setting in the delay circuits 9 and 10 will now be described. In the present embodiment, the inner detected signal Sin is subtracted in the subtracter 11 from the central detected signal Scent. As a result, the crosstalk caused in the central detected signal Scent by the inner track is removed. In addition, the outer detected signal Sout is subtracted from the central detected signal Scent. As a result, the crosstalk caused in the central detected signal Scent by the outer track is removed.

The inner light spot LS1, the central light spot LS2, and the outer light spot LS3 are disposed at intervals of L in the extension direction of information tracks in order to eliminate interference between the light spots. Among the three light spots, a light spot located at the head of others in the direction of advance of the light beams is the inner light spot LS1.

The inner light spot LS1 is located 2L ahead of the outer light spot LS2. Therefore, the inner detected signal Sin generated from the inner light spot LS1 is located 2DL ahead of the outer detected signal Sout generated from the outer light spot LS3. The central light spot is located L ahead of the outer light spot LS2. Therefore, the central detected signal Scent generated from the central light spot LS2 is located DL ahead of the outer detected signal Sout.

In the information reproducing apparatus S, therefore, the inner detected signal Sin is delayed by the delay value (DL×2), and the central detected signal Scent is delayed the delay value DL. As a result, it is possible to simultaneously obtain three detected signals containing information recorded on three information tracks which are located on a straight line along the radial direction of the optical disk 1 and which are adjacent to each other. At the time when the outer detected signal Sout has been generated in the information reproducing apparatus S, the three detected signals are simultaneously inputted to the subtracter 11 and the variable coefficient filters 15 and 16.

Even during this delay processing interval, the optical disk 1 itself moves at the velocity $V_L$. Eventually, therefore, detected signals based upon pits P lining up in a single file in the radial direction of the optical disk 1 are simultaneously inputted to the subtracter 11 by the delay processing. As a result, each crosstalk can be removed accurately.

By using filter coefficients described later and contained in a filter coefficient signal Sci supplied from the filter coefficient computation circuit 14, the variable coefficient filter 15 conducts filter processing on the inputted inner detected signal Sin. The variable coefficient filter 15 thus generates an inner crosstalk signal Sfi corresponding to a crosstalk component caused by the inner track, and supplies the inner crosstalk signal Sfi to the subtracter 11.

On the other hand, the variable coefficient filter 16 conducts filter processing on the inputted outer detected signal Sout by using filter coefficients described later and contained in a filter coefficient signal Sco supplied from the filter coefficient computation circuit 14. The variable coefficient filter 16 thus generates an outer crosstalk signal Sfo corresponding to a crosstalk component caused by the outer track, and supplies the outer crosstalk signal Sfo to the subtracter 11.

Operation of the zero cross sample extractor 13 and the filter coefficient computation circuit 14 accompanying the operation of the variable coefficient filters 15 and 16 will be described in detail later.

On the basis of the inner crosstalk signal Sfi, the central detected signal Scent, and the outer crosstalk signal Sfo inputted to the subtracter 11, the subtracter 11 subtracts the value of the inner crosstalk signal Sfi and the value of the outer crosstalk signal Sfo from the central detected signal Scent. Thus the subtracter 11 removes the crosstalk caused by the inner track and the crosstalk caused by the inner track, generates a removed signal Sd, and supplies the removed signal Sd to the demodulator 12 and the zero cross sample extractor 13.

As a result, the demodulator 12 demodulates the removed signal Sd, and generates a reproduced signal Ss which corresponds to information recorded on the optical disk 1 to be reproduced.

The configuration of the variable coefficient filters 15 and 16 will now be described by referring to FIG. 2. The variable coefficient filters 15 and 16 have the same basic configuration. In the ensuing description, therefore, the configuration of the variable coefficient filter 15 will be described on behalf of them.

Figure 2:
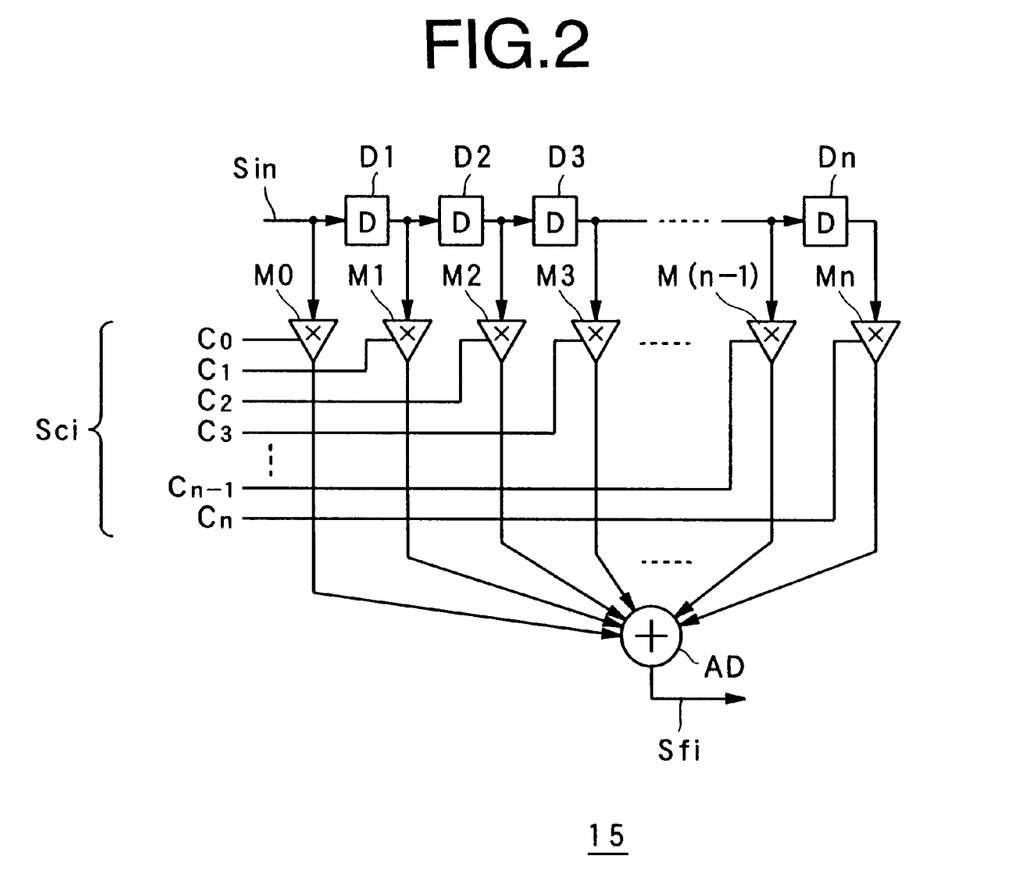
FIG. 2 is a block diagram showing a schematic configuration of a delay circuit of an embodiment.

As shown in FIG. 2, the variable coefficient filter 15 is formed as a transversal filter. To be concrete, the variable coefficient filter 15 includes n D-flip-flop circuits D1 through Dn connected in series, coefficient multipliers M0 through Mn, and an adder AD.

Operation of the variable coefficient filter 15 will now be described together with the operation of the zero cross sample extractor 13 and the filter coefficient computation circuit 14.

It is now assumed among three consecutive samples in the removed signal Sd that each sample value changes from positive to negative or from negative to positive. In this case, the zero cross sample extractor 13 extracts the center sample of the three samples, i.e., a zero cross sample, and supplies its value to the filter coefficient computation circuit 14 as an error signal Se.

On the basis of the inner detected signal Sin and the error signal Se, the filter coefficient computation circuit 14 computes filter coefficients (Co through Cn in FIG. 2) of the variable coefficient filter 15. The filter coefficient computation circuit 14 generates a filter coefficient signal Sci containing the filter coefficients Co through Cn, and supplies it to the variable coefficient filter 15.

In parallel therewith, the filter coefficient computation circuit 14 computes filter coefficients of the variable coefficient filter 16 on the basis of the outer detected signals Sout and the error signal Se, generates a filter coefficient signal Sco containing the filter coefficients, and supplies it to the variable coefficient filter 16.

To be concrete, the filter coefficient computation circuit 14 successively updates the filter coefficients of each of the variable coefficient filters 15 and 16 so as to make the error signal Se converge to "0" by using, for example, the LMS (Least Mean Square) adaptive algorithm. The filter coefficient computation circuit 14 thus generates the corresponding filter coefficient signals Sci and Sco.

The D-flip-flop circuits D1 through Dn in the variable coefficient filter 15, as shown in FIG. 2, successively takes in a sequence of input sample values corresponding to the digitized and inputted inner detected signal Sin while shifting the sequence.

On the other hand, the coefficient multiplier M0 in the variable coefficient filter 15 multiplies the input sample value sequence corresponding to the inner detected signal Sin by the filter coefficient C0, and supplies a resultant product to the adder AD.

Furthermore, the coefficient multipliers M1 through Mn in the variable coefficient filter 15 multiply output signals of the D-flip-flop circuits D1 through Dn by the filter coefficients C1 through Cn respectively, and supplies resultant products to the adder AD respectively.

The adder AD in the variable coefficient filter 15 adds all output signals of the coefficient multipliers M0 through Mn, and outputs a sequence of output sample values corresponding to the crosstalk caused by the inner track. The sequence of output sample values is supplied as the above described inner crosstalk signal Sfi to the subtracter 11.

The operation of the variable coefficient filter 16 using the filter coefficients contained in the filter signal Sco is the same as that of the above described variable coefficient filter 15 except that concrete values of the inputted filter coefficients are different. Therefore, description of details of the variable coefficient filter 16 will be omitted.

An optical material forming the diffraction grating 6 in the optical pickup PU of an embodiment will now be described.

As described above, in the present embodiment, the coefficient of linear expansion $\beta$ of the optical material forming the diffraction grating 6 is set equal to the change value of the oscillation wavelength of the laser diode 7 caused by a temperature change (i.e., the change value of the oscillation wavelength caused when the ambient temperature has changed by 1° C.). Thereby, the spacing L between the irradiation position of the main light beam BM and the irradiation position of the first subsidiary light beam $BS_1$ or the irradiation position of the second subsidiary light beam $BS_2$ (see FIG. 1) is kept constant.

Therefore, it is most desirable that the coefficient of linear expansion $\beta$ of the optical material forming the diffraction grating 6 is set equal to the change value $\Delta\lambda/\lambda_0$ of the oscillation wavelength caused by a temperature change (see equation (7)).

Actually, however, kinds of the optical material which can be used as the diffraction grating 6 are limited. On the other hand, the change value of the oscillation length caused by a temperature change varies according to the material or the like forming the laser diode 7.

As a result, it is not easy to set the coefficient of linear expansion $\beta$ strictly equal to the change value $\Delta\lambda/\lambda_0$ of the oscillation wavelength of the laser diode 7 caused by a temperature change. In the diffraction grating 6 of the embodiment, therefore, a permissible range of the coefficient of linear expansion $\beta$ is determined so as to make the coefficient of linear expansion $\Delta$ substantially equal to the change value $\Delta\lambda/\lambda_0$ caused by a temperature change, so long as the information reproduction is not hindered. By using an optical material having the coefficient of linear expansion $\beta$ in this permissible range, the diffraction grating 6 is formed.

The permissible range of the coefficient of linear expansion $\beta$ is determined by $$\alpha - \Delta\alpha_1 \leq \beta \leq \alpha + \Delta\alpha_2 \qquad (9)$$

where $\alpha = \Delta\lambda/\lambda_0$ $\Delta\alpha_1 = \{(1+\alpha \times \Delta t_{max}) \times \Delta L_{max}\}/\{(L_0 + \Delta L_{max}) \times \Delta t_{max}\}$ $\Delta\alpha_2 = \{(1+\alpha \times \Delta t_{max}) \times \Delta L_{max}\}/\{(L_0 - \Delta L_{max}) \times \Delta t_{max}\}$ At this time, $\lambda_0$ is the oscillation wavelength of the laser diode 7 at the design temperature of the optical pickup PU. $\Delta\lambda$ is the change value of the oscillation wavelength per unit temperature. $\Delta t_{max}$ is a predetermined permissible change value of the ambient temperature at which the optical pickup PU is used. $L_0$ is the spacing between the irradiation position of the first subsidiary light beam $BS_1$ or the irradiation position of the second subsidiary light beam $BS_2$ and the irradiation position of the main light beam BM on the optical disk 1 at the design temperature. $\Delta L_{max}$ is a predetermined permissible change value of the spacing on the optical disk 1.

Among the above described parameters, "$\lambda_0$" and "$\Delta\lambda$" are predetermined according to the material or the like of the laser diode 7. Furthermore, "$L_0$" is set so that the light beams will not interfere with each other, according to the area of the irradiation range of each of the first subsidiary light beam $BS_1$, the second subsidiary light beam $BS_2$, and the main light beam BM on the optical disk 1. In the case where the optical disk 1 is a DVD, "$L_0$" is set equal to a value in the range of approximately 10 to 20 $\mu$m.

As for the parameter $\Delta t_{max}$, it is set by considering the ambient temperature at which the optical pickup PU might be installed. For example, if the design temperature is 25° C., the parameter $\Delta t_{max}$ is set equal to approximately 60° C. (In this case, the above described range of considered ambient temperature is the range of −35° C. to 85° C.)

Setting of the parameter $\Delta L_{max}$ will now be described.

As described above, the parameter $\Delta L_{max}$ is a permissible change value of the spacing between the irradiation position of the first subsidiary light beam $BS_1$ or the irradiation position of the second subsidiary light beam $BS_2$ and the irradiation position of the main light beam BM on the optical disk 1. In the crosstalk removing method of the embodiment, in order to correctly reproduce contents of the information actually read out by respective light beams, the value of the parameter $\Delta L_{max}$ is set on the basis of the range of such spacing between the light beams that information can be reproduced without errors.

In addition to this, the parameter $\Delta L_{max}$ is set by also considering the so-called number of taps of the transversal filter in the variable coefficient filter 15 or 16.

This will now be described. In the variable coefficient filter 15 or 16 shown in FIG. 2, the delay value in one D-flip-flop circuit is set equal to the delay value of 1T where T is the unit of the length of the pits P on the optical disk 1. The unit "T" is popularly used in the technical field of DVD.

Even if an error is contained in the output of one D-flip-flop circuit due to a change of spacing between the irradiation position of the first subsidiary light beam $BS_1$ or the irradiation position of the second subsidiary light beam $BS_2$ and the irradiation position of the main light beam BM, a correct detected value corresponding to a pit P to be read out is contained in outputs of other D-flip-flop circuits in the case where the number of taps is large. By adding outputs of D-flip-flop circuits in the adder AD, therefore, the probability that the inner crosstalk signal Sfi or the outer crosstalk signal Sfo can be generated more correctly is raised.

As the number of taps in the delay circuit 9 or 10 increases, the parameter $\Delta L_{max}$ becomes large as evident from the foregoing description. To be more concrete, it is now assumed that the optical disk 1 is the above described DVD. When the number of taps is only one, the parameter $\Delta L_{max}$ is set equal to approximately ±1T. When the number of taps is three and three consecutive taps are used (n=3 in FIG. 2), the parameter $\Delta L_{max}$ is set equal to approximately ±2T. When the number of taps is five and five consecutive taps are used (n=5 in FIG. 2), the parameter $\Delta L_{max}$ is set equal to approximately ±3T.

Concrete examples of the optical material used as the diffraction grating 6 will now be described by referring to FIGS. 3A and 3B.

In a first example, the parameters are set as follows: $\lambda_0=0.4$ μm, $\Delta\lambda=0.08$ nm/° C., $\Delta t_{max}=60°$ C., $\Delta L_{max}=1T$ (=0.08 μm), and $L_0=15.0$ μm. From the equation (9), the possible range of the coefficient of linear expansion β becomes $$11.06\times10^{-5}(° C.^{-1}) \leq \beta \leq 28.95\times10^{-5}(° C.^{-1}) \qquad (10)$$

In this case, diethylene glycol bisallyl carbonate (trade name CR-39) having a value of coefficient of linear expansion β equal to $11.7\times10^{-5}(° C^{-1})$ or poly-4-methyl pentene-1(trade name TPX) having the same value of coefficient of linear expansion β equal to $11.7\times0^{-5}(° C^{-1})$ can be used as the material of the diffraction grating 6.

Figure 3A:
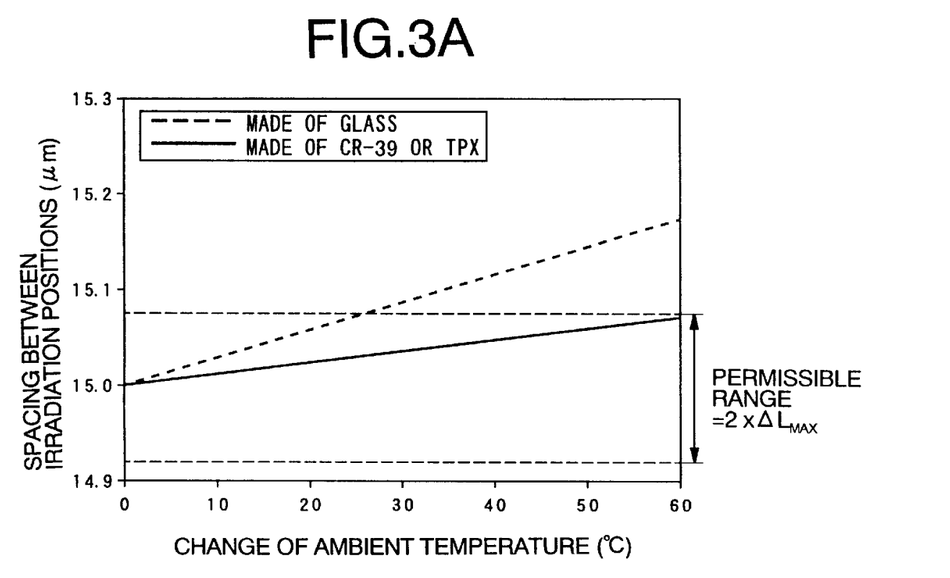
FIG. 3A is a diagram showing the change value of spacing between light beams as a function of the temperature in a first embodiment.

FIG. 3A shows the change of spacing between the irradiation position of the first subsidiary light beam $BS_1$ or the second subsidiary light beam $BS_2$ and the irradiation position of the main light beam BM caused by a temperature change. In the case where the diffraction grating 6 is made of diethylene glycol bisallyl carbonate or poly-4-methyl pentene-1 (as indicated by a solid line in FIG. 3A), the change value is within the permissible range (i.e., the range of $2\times\Delta L_{max}$), unlike the case where the diffraction grating 6 is made of glass (the coefficient of linear expansion β=0) as indicated by a broken line in FIG. 3A.

In a second example, the parameters are set as follows: $\lambda_0=0.4$ μm, $\Delta\lambda=0.08$ nm/° C., $\Delta t_{max}=60°$ C., $\Delta L_{max}=1T$ (=0.08 μm), and $L_0=10.0$ μm. From the equation (9), the possible range of the coefficient of linear expansion β becomes $$6.61\times10^{-5}(° C^{-1}) \leq \beta \leq 33.39\times10^{-5}(° C^{-1}) \qquad (11)$$

In this case, PMMA (Poly Methyl Methacrylate) having a value of coefficient of linear expansion β equal to $7\times10^{-5}(° C.^{-1})$ or PC (Poly Carbonate) having a value of coefficient of linear expansion β equal to $8\times10^{-5}(° C^{-1})$ can also be used as the material of the diffraction grating 6.

Figure 3B:
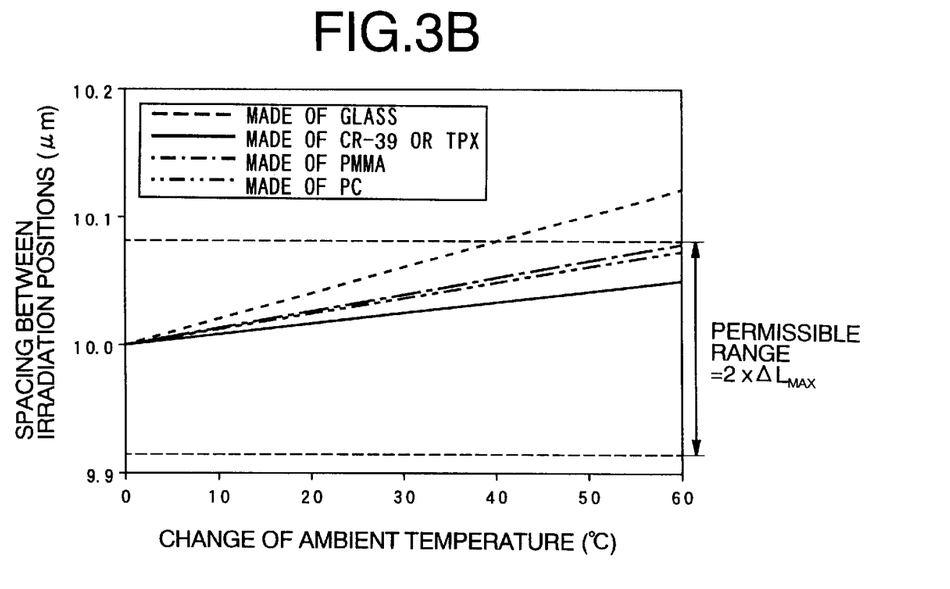
FIG. 3B is a diagram showing a change value of spacing between light beams as a function of the temperature in a second embodiment.

FIG. 3B also shows the change of spacing between the irradiation position of the first subsidiary light beam $BS_1$ or the second subsidiary light beam $BS_2$ and the irradiation position of the main light beam BM caused by a temperature change. In the case where the diffraction grating 6 is made of diethylene glycol bisallyl carbonate or poly-4-methyl pentene-1 (as indicated by a solid line in FIG. 3B), the case where the diffraction grating 6 is made of PMMA (as indicated by a dotted line in FIG. 3B), and the case where the diffraction grating 6 is made of PC (as indicated by a dotted line in FIG. 3B), the change value is within the permissible range, unlike the case where the diffraction grating 6 is made of glass (as indicated by a broken line in FIG. 3B).

Even if the oscillation length of the laser diode 7 is changed by a change of the ambient temperature, therefore, this can be canceled and the change of spacing between the irradiation position of the first subsidiary light beam $BS_1$ or the second subsidiary light beam $BS_2$ and the irradiation position of the main light beam BM can be restricted in the permissible range.

In the configuration of the information reproducing apparatus S of the embodiment, the permissible range of the coefficient of linear expansion β of the optical material forming the diffraction grating 6 is determined as heretofore been described by $$\alpha-\Delta\alpha_1 \leq \beta \leq \alpha+\Delta\alpha_2$$

where $$\alpha=\Delta\lambda/\lambda_0$$

$$\Delta\alpha_1=\{(1+\alpha\times\Delta t_{max})\times\Delta L_{max}\}/\{(L_0+\Delta L_{max})\times\Delta t_{max}\}$$

$$\Delta\alpha_2=\{(1+\alpha\times\Delta t_{max})\times\Delta L_{max}\}/\{(L_0-\Delta L_{max})\times\Delta t_{max}\}$$

where $\lambda_0$=the oscillation wavelength of the laser diode 7 at the design temperature of the optical pickup PU, $\Delta\lambda$=the change value of the oscillation wavelength per unit temperature, $\Delta t_{max}$=a preset permissible change value of the ambient temperature at which the optical pickup PU is used, $L_0$=the spacing between the irradiation position of the first subsidiary light beam $BS_1$ or the irradiation position of the second subsidiary light beam $BS_2$ and the irradiation position of the main light beam BM on the optical disk 1 at the design temperature, and $\Delta L_{max}$=a preset permissible change value of the spacing on the optical disk 1.

Even if the oscillation length of the laser diode 7 is changed by a change of the ambient temperature, therefore, the change of spacing between the irradiation position of the main light beam BM and the irradiation position of the first subsidiary light beam $BS_1$ or the second subsidiary light beam $BS_2$ can be restricted in the permissible range. Accordingly, crosstalk can be removed accurately and stably.

Furthermore, in the case where the coefficient of linear expansion β can be set equal to $$\beta = \Delta\lambda/\lambda_0,$$

the spacing between the irradiation position of the main light beam BM and the irradiation position of the first subsidiary light beam $BS_1$ or the second subsidiary light beam $BS_2$ can be kept constant, even if the oscillation length is changed by a change of the ambient temperature. Accordingly, the crosstalk can be removed more accurately and stably.

Furthermore, even if the oscillation length of the laser diode 7 is changed by a change of the ambient temperature, information can be reproduced while removing the crosstalk accurately and stably.

In the above described embodiment, crosstalk has been removed by using two subsidiary light beams. Besides, however, the present invention can also be applied to the case where information from three or more information tracks is detected by using two or more subsidiary light beams and crosstalk should be removed by using them. In this case, the spacing between the irradiation position of each of subsidiary light beams and the irradiation position of the main light beam is restricted into a permissible range.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-252196 filed on Sep. 7, 1998 including the specification, claims, drawings and summary is incorporated herein by reference in its entirety.

What is claimed is:

1. An optical pickup for reading information recorded on a plurality of information tracks of a recording medium by using at least a main light beam and a subsidiary light beam, the main light beam being applied to a reading track which is one of the plurality of information tracks on which the information to be read is recorded, the subsidiary light beam being applied to an adjacent track which is different one of the plurality of information tracks adjacent to the reading track, the optical pickup comprising:

a light source for emitting an original light beam;

a diffraction device for diffracting the original light beam to divide the original light beam into the main light beam and the subsidiary light beam, so that the main light beam and the subsidiary light beam are applied to the reading track and the adjacent track, respectively; and a receiving device for receiving the main light beam and the subsidiary light beam reflected by the recording medium and generating a main signal corresponding to the received main light beam and a subsidiary signal corresponding to the received subsidiary light beam, wherein the diffracting device is made of an optical material having coefficient of linear expansion β, which is determined as follows:

$$\alpha - \Delta\alpha_1 \leq \beta \leq \alpha + \Delta\alpha_2,$$

$$\alpha = \Delta\lambda/\lambda_0,$$

$$\Delta\alpha_1 = \{(1 + \alpha \times \Delta t_{max}) \times \Delta L_{max}\}/\{(L_0 + \Delta L_{max}) \times \Delta t_{max}\},$$

$$\Delta\alpha_2 = \{(1 + \alpha \times \Delta t_{max}) \times \Delta L_{max}\}/\{(L_0 - \Delta L_{max}) \times \Delta t_{max}\},$$

where $\lambda_0$ is a wavelength of the original light beam at a design temperature of the optical pickup, $\Delta\lambda$ is an amount of a change of the wavelength of the original light beam per unit temperature, $\Delta t_{max}$ is a predetermined permissible amount of a change of an ambient temperature at which the optical pickup is used, $L_0$ is a spacing between an irradiation position of the subsidiary light beam and an irradiation position of the main light beam at the design temperature, and $\Delta L_{max}$ is a predetermined permissible amount of a change of the spacing between the irradiation position of the subsidiary light beam and the irradiation position of the main light beam.

2. The optical pickup according to claim 1, wherein the coefficient of linear expansion β is equal to the value α.

3. The optical pickup according to claim 1, wherein the optical material of the diffracting device is diethylene glycol bisallyl carbonate.

4. The optical pickup according to claim 1, wherein the optical material of the diffracting device is poly-4-methyl pentene-1.

5. The optical pickup according to claim 1, wherein the optical material of the diffracting device is poly methyl methacrylate.

6. The optical pickup according to claim 1, wherein the optical material of the diffracting device is poly carbonate.

7. An optical pickup for reading information recorded on a plurality of information tracks of a recording medium by using a main light beam, a first subsidiary light beam and a second subsidiary light beam, the main light beam being applied to a reading track which is one of the plurality of information tracks on which the information to be read is recorded, the first subsidiary light beam being applied to a first adjacent track which is different one of the plurality of information tracks adjacent to one side of the reading track, the second subsidiary light beam being applied to a second adjacent track which is further different one of the plurality of information tracks adjacent to another side of the reading track, a spacing between an irradiation position of the main light beam and an irradiation position of the first subsidiary light beam is equal to a spacing between an irradiation position of the main light beam and an irradiation position of the second subsidiary light beam, the optical pickup comprising:

a light source for emitting an original light beam;

a diffraction device for diffracting the original light beam to divide the original light beam into the main light beam, the first subsidiary light beam and the second subsidiary light beam, so that the main light beam, the first subsidiary light beam and the second subsidiary light beam are applied to the reading track, the first adjacent track and the second adjacent track, respectively; and a receiving device for receiving the main light beam, the first subsidiary light beam and the second subsidiary light beam reflected by the recording medium and generating a main signal corresponding to the received main light beam, a first subsidiary signal corresponding to the received first subsidiary light beam and a second subsidiary signal corresponding to the received second subsidiary light beam, wherein the diffracting device is made of an optical material having coefficient of linear expansion β, which is determined as follows:

$$\alpha - \Delta\alpha_1 \leq \beta \leq \alpha + \Delta\alpha_2,$$

$$\alpha = \Delta\lambda/\lambda_0,$$

$$\Delta\alpha_1 = \{(1+\alpha\times\Delta t_{max})\times\Delta L_{max}\}/\{(L_0+\Delta L_{max})\times\Delta t_{max}\},$$

$$\Delta\alpha_2 = \{(1+\alpha\times\Delta t_{max})\times\Delta L_{max}\}/\{(L_0-\Delta L_{max})\times\Delta t_{max}\},$$

where $\lambda_0$ is a wavelength of the original light beam at a design temperature of the optical pickup, $\Delta\lambda$ is an amount of a change of the wavelength of the original light beam per unit temperature, $\Delta t_{max}$ is a predetermined permissible amount of a change of an ambient temperature at which the optical pickup is used, $L_0$ is a spacing between the irradiation position of the first subsidiary light beam and the irradiation position of the main light beam at the design temperature, and $\Delta L_{max}$ is a predetermined permissible amount of a change of the spacing between the irradiation position of the first subsidiary light beam and the irradiation position of the main light beam.

8. The optical pickup according to claim 7, wherein the coefficient of linear expansion A is equal to the value α.

9. The optical pickup according to claim 7, wherein the main light beam, the first subsidiary light beam and the second subsidiary light beam are moved along the respective information tracks in a predetermined direction, the irradiation position of the first subsidiary light beam is located ahead of the irradiation position of the main light beam in the predetermined direction, the irradiation position of the main light beam is located ahead of the irradiation position of the second subsidiary light beam in the predetermined direction.

10. The optical pickup according to claim 7, wherein the optical material of the diffracting device is diethylene glycol bisallyl carbonate.

11. The optical pickup according to claim 7, wherein the optical material of the diffracting device is poly-4-methyl pentene-1.

12. The optical pickup according to claim 7, wherein the optical material of the diffracting device is poly methyl methacrylate.

13. The optical pickup according to claim 7, wherein the optical material of the diffracting device is poly carbonate.

14. An apparatus for reading information recorded on a plurality of information tracks of a recording medium by using a main light beam, a first subsidiary light beam and a second subsidiary light beam and reproducing the read information, the main light beam being applied to a reading track which is one of the plurality of information tracks on which the information to be read is recorded, the first subsidiary light beam being applied to a first adjacent track which is different one of the plurality of information tracks adjacent to one side of the reading track, the second subsidiary light beam being applied to a second adjacent track which is further different one of the plurality of information tracks adjacent to another side of the reading track, a spacing between an irradiation position of the main light beam and an irradiation position of the first subsidiary light beam is equal to a spacing between an irradiation position of the main light beam and an irradiation position of the second subsidiary light beam, the apparatus comprising:

(a) an optical pickup for emitting the main light beam, the first subsidiary light beam and the second subsidiary light beam to the recording medium, and generating a main signal corresponding to the main light beam reflected by the recording medium, a first subsidiary signal corresponding to the first subsidiary light beam reflected by the recording medium and a second subsidiary signal corresponding to the second subsidiary reflected by the recording medium;

(b) a removing device for removing crosstalk caused by the first adjacent track and the second adjacent track from the main signal by using the first subsidiary signal and the second subsidiary signal; and (c) a reproducing device for reproducing the information on the basis of the main signal supplied from the removing device, wherein the optical pickup comprises:

a light source for emitting an original light beam;

a diffraction device for diffracting the original light beam to divide the original light beam into the main light beam, the first subsidiary light beam and the second subsidiary light beam, so that the main light beam, the first subsidiary light beam and the second subsidiary light beam are applied to the reading track, the first adjacent track and the second adjacent track, respectively; and a receiving device for receiving the main light beam, the first subsidiary light beam and the second subsidiary light beam reflected by the recording medium and generating the main signal, the first subsidiary signal and the second subsidiary signal, wherein the diffracting device is made of an optical material having coefficient of linear expansion β, which is determined as follows:

$$\alpha - \Delta\alpha_1 \leq \beta \leq \alpha + \Delta\alpha_2,$$

$$\alpha = \Delta\lambda/\lambda_0,$$

$$\Delta\alpha_1 = \{(1+\alpha\times\Delta t_{max})\times\Delta L_{max}\}/\{(L_0+\Delta L_{max})\times\Delta t_{max}\},$$

$$\Delta\alpha_2 = \{(1+\alpha\times\Delta t_{max})\times\Delta L_{max}\}/\{(L_0-\Delta L_{max})\times\Delta t_{max}\},$$

where $\lambda_0$ is a wavelength of the original light beam at a design temperature of the optical pickup, $\Delta\lambda$ is an amount of a change of the wavelength of the original light beam per unit temperature, $\Delta t_{max}$ is a predetermined permissible amount of a change of an ambient temperature at which the optical pickup is used, $L_0$ is a spacing between the irradiation position of the first subsidiary light beam and the irradiation position of the main light beam at the design temperature, and $\Delta L_{max}$ is a predetermined permissible amount of a change of the spacing between the irradiation position of the first subsidiary light beam and the irradiation position of the main light beam.

15. The apparatus according to claim 14, wherein the coefficient of linear expansion β is equal to the value α.

16. The apparatus according to claim 14, wherein the main light beam, the first subsidiary light beam and the second subsidiary light beam are moved along the respective information tracks in a predetermined direction, the irradiation position of the first subsidiary light beam is located ahead of the irradiation position of the main light beam in the predetermined direction, the irradiation position of the main light beam is located ahead of the irradiation position of the second subsidiary light beam in the predetermined direction.

17. The apparatus according to claim 14, wherein the optical material of the diffracting device is diethylene glycol bisallyl carbonate.

18. The apparatus according to claim 14, wherein the optical material of the diffracting device is poly-4-methyl pentene-1.

19. The apparatus according to claim 14, wherein the optical material of the diffracting device is poly methyl methacrylate.

20. The apparatus according to claim 14, wherein the optical material of the diffracting device is poly carbonate.

* * * * *